(12) United States Patent
Song et al.

(10) Patent No.: US 11,512,768 B2
(45) Date of Patent: Nov. 29, 2022

(54) BELT PULLEY STRUCTURE OF ENGINE

(71) Applicants: Hyundai Motor Company, Seoul (KR); Kia Motors Corporation, Seoul (KR)

(72) Inventors: Sun Young Song, Gyeonggi-do (KR); Jung Hwan Moon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 724 days.

(21) Appl. No.: 16/513,331

(22) Filed: Jul. 16, 2019

(65) Prior Publication Data

US 2020/0271209 A1  Aug. 27, 2020

(30) Foreign Application Priority Data

Feb. 21, 2019 (KR) .......................... 10-2019-0020438

(51) Int. Cl.
*F16H 55/36* (2006.01)
*F16D 41/04* (2006.01)
*F16F 15/06* (2006.01)
*F16F 15/10* (2006.01)

(52) U.S. Cl.
CPC ............. *F16H 55/36* (2013.01); *F16D 41/04* (2013.01); *F16F 15/063* (2013.01); *F16F 15/10* (2013.01); *F16H 2055/366* (2013.01)

(58) Field of Classification Search
CPC .............. F16H 55/36; F16H 2055/366; F16H 57/0006; F16H 41/24; F16D 41/04; F16F 15/063; F16F 15/10; F16F 15/1442; F16F 15/124; F02B 67/06
See application file for complete search history.

(56) References Cited

U.S. PATENT DOCUMENTS

| | | | |
|---|---|---|---|
| 2015/0024885 A1* | 1/2015 | Odenmarck | F16D 3/84 474/94 |
| 2015/0027844 A1* | 1/2015 | Serkh | F16D 7/022 192/75 |
| 2017/0122425 A1* | 5/2017 | Schneider | F16D 13/76 |

FOREIGN PATENT DOCUMENTS

KR   10-2005-0109936 A   11/2005

* cited by examiner

Primary Examiner — David J Hlavka
(74) Attorney, Agent, or Firm — Fox Rothschild LLP

(57) ABSTRACT

A belt pulley structure of an engine is provided to prevent abnormal noise from generating between a belt pulley and a torsional vibration damper. The belt pulley structure includes a stepped portion that is formed in a shape that blocks a cavity in a radial direction thereof. The cavity is formed at a portion where a belt pulley and a torsional vibration damper face each other.

7 Claims, 4 Drawing Sheets

BELT PULLEY STRUCTURE OF ENGINE

CROSS REFERENCE TO RELATED APPLICATION

The present application claims priority of Korean Patent Application No. 10-2019-0020438 filed on Feb. 21, 2019, the entire contents of which is incorporated herein for all purposes by this reference.

BACKGROUND

Field of the Disclosure

The present disclosure relates to a belt pulley structure of an engine, and more particularly, to a belt pulley structure that prevents abnormal noise from occurring between a belt pulley and a torsional vibration damper.

Description of the Related Art

A mild hybrid vehicle structure in which a 48V battery is mounted, as shown in FIG. 1, is a structure which omits an alternator of a conventional vehicle and mounts a 48V battery, a direct current/direct current (DC/DC) converter and a mild hybrid starter and generator (MHSG). The mild hybrid structure of 48V receives the power required by the vehicle through an electric motor in the operating ranges such as starting and accelerating and has the advantages of improving the fuel efficiency of the vehicle through the regenerative braking function that recovers the energy generated during the braking of the vehicle and stores the energy in the battery.

However, the mild hybrid structure of 48V increases belt load which deteriorates belt durability due to frequent starting with MHSG and the use of torque assist and regenerative braking during driving as well as a torsional vibration of an engine. In other words, the torsional vibration of the engine increases the behavior of a tensioner, induces a slip of a belt thus deteriorating the lifetime of an accessory drive belt structure and causes abnormal noise during operation.

Accordingly, a technique has been developed that mounts a pulley decoupler on a belt pulley to stabilize the vibration of the tensioner through the torsional vibration and reduce the slip of the belt. However, although application of the pulley decoupler improves the durability and noise of the belt and tensioner, this structure causes Noise-Vibration-Harshness (NVH) due to interference between structures.

For example, in a structure with the torsional vibration damper installed on the belt pulley, abnormal noise is amplified in a specific frequency band. This occurs between the belt pulley and the torsional vibration damper.

The foregoing is intended merely to aid in the understanding of the background of the present disclosure, and is not intended to mean that the present disclosure falls within the purview of the related art that is already known to those skilled in the art.

SUMMARY

The present disclosure provides a belt pulley structure of an engine that prevents abnormal noise from generating between a belt pulley and a torsional vibration damper. A configuration of the present disclosure may include a stepped portion formed in a shape of blocking, in a radial direction, a cavity disposed at a portion where a belt pulley and a torsional vibration damper face each other.

The torsional vibration damper may be coupled to the belt pulley in an axial direction thereof; and the stepped portion may be formed at the torsional vibration damper to protrude toward the belt pulley. The cavity may be formed between one surface in an axial direction including a rim of one end portion of the belt pulley and the torsional vibration damper facing the one surface; and the stepped portion may be formed in a protruding shape to cover an inlet of the cavity.

The stepped portion may be formed in a shape that covers the rim of the one end portion of the belt pulley. Additionally, the stepped portion may be formed with a predetermined gap in a radial direction from the rim of the one end portion of the belt pulley. An inertial ring may be coupled to the torsional vibration damper along a circumferential direction thereof. The stepped portion may be formed to be gradually increased in height at one surface of the inertial ring with a shape of protruding toward the belt pulley. A pulley decoupler may be coupled to the belt pulley and a torsional vibration damper may be coupled to the pulley decoupler.

In accordance with the present disclosure, a stepped portion may be formed in the radial direction of the cavity to block the sound waves generated in the cavity and prevent the sound waves from being diverted to the outside of the cavity, which changes the resonance characteristic in the belt pulley structure, thereby preventing abnormal noise from being generated in the engine structure.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present disclosure will be described in detail with reference to the attached drawing as follows.

Figure 1:
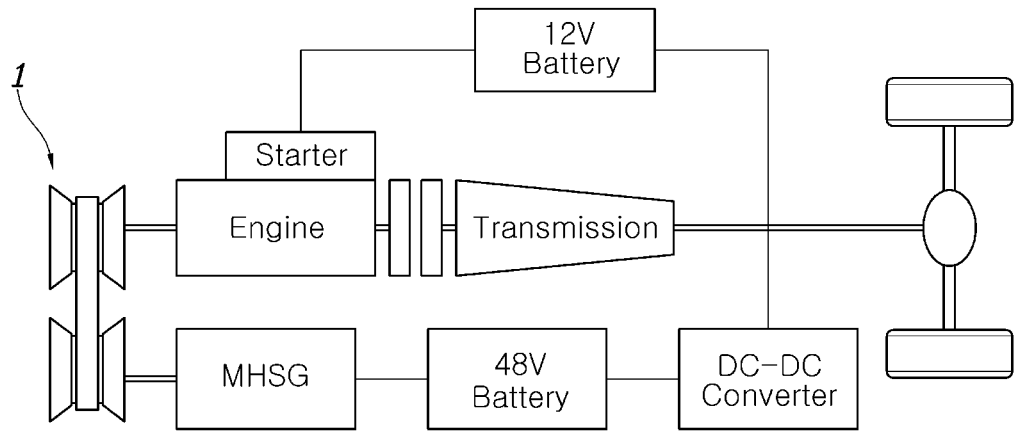
FIG. 1 is a view showing a mild hybrid structure of 48V according to the related art.
Figure 2:
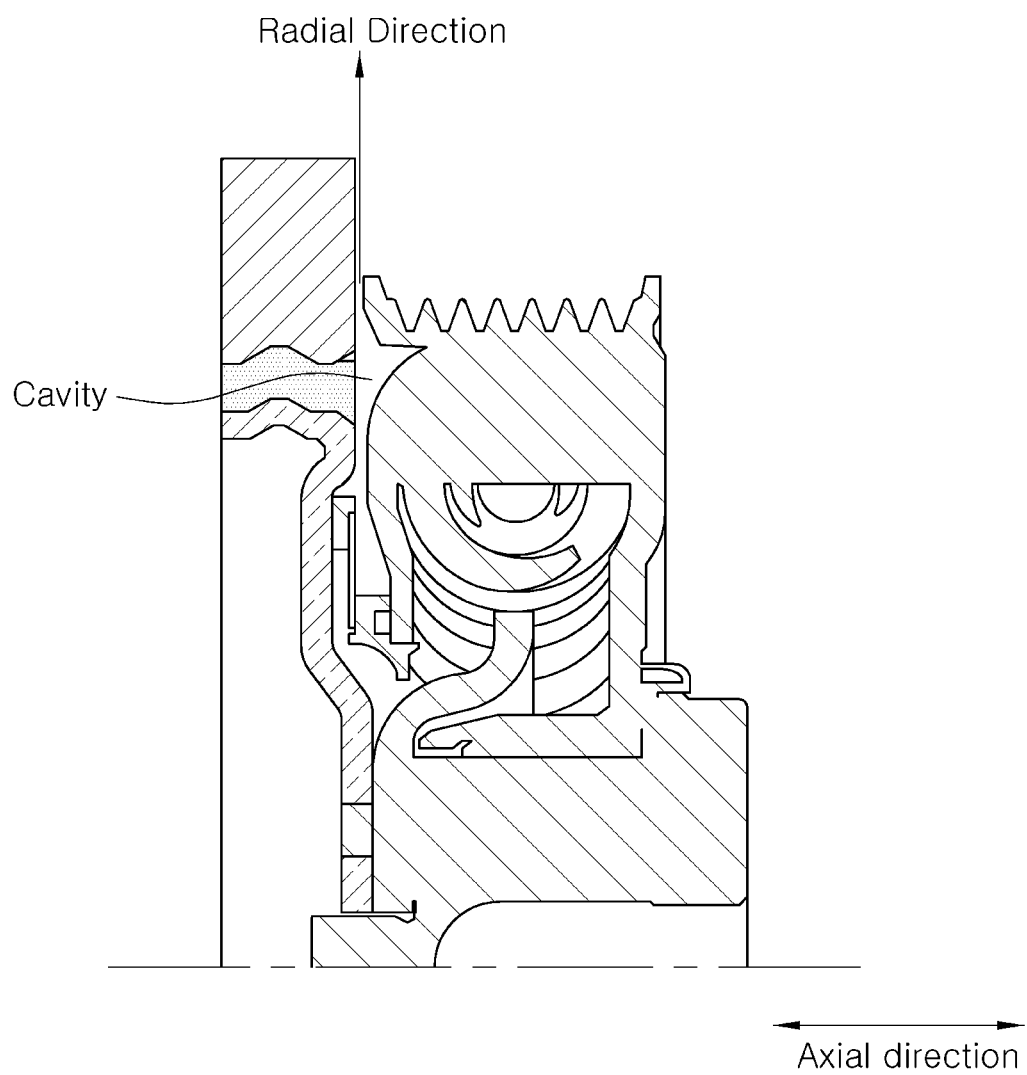
FIG. 2 is a view showing a configuration that the radial direction of a cavity is opened in a conventional belt pulley structure according to the related art.

A belt pulley structure 1 of an engine according to the present disclosure may be applied to a vehicle of a 48V mild hybrid structure as shown in FIG. 1, and in addition, applied to a vehicle in which a starter and generator is connected with an engine in other ways. In other words, the power transmitted from a crankshaft of the engine may be transmitted to a mild hybrid starter and generator (MHSG) by a belt pulley electric-driven structure and a torsional vibration damper 7 may be installed on a belt pulley 3. Particularly, the present disclosure may remove the abnormal noise generated in the belt pulley structure 1 through the configuration improvement of the torsional vibration damper 7.

Figure 3:
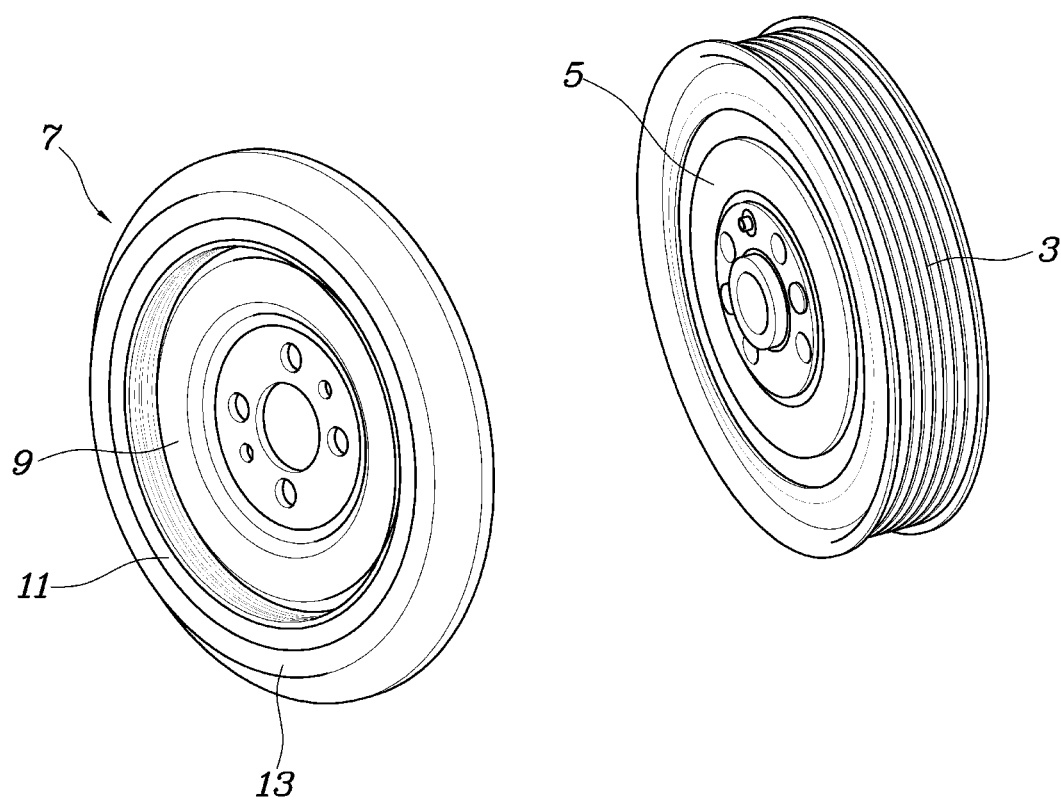
FIG. 3 is a view showing a state before a torsional vibration damper and a belt pulley according to an exemplary embodiment of the present disclosure are coupled to each other.
Figure 4:
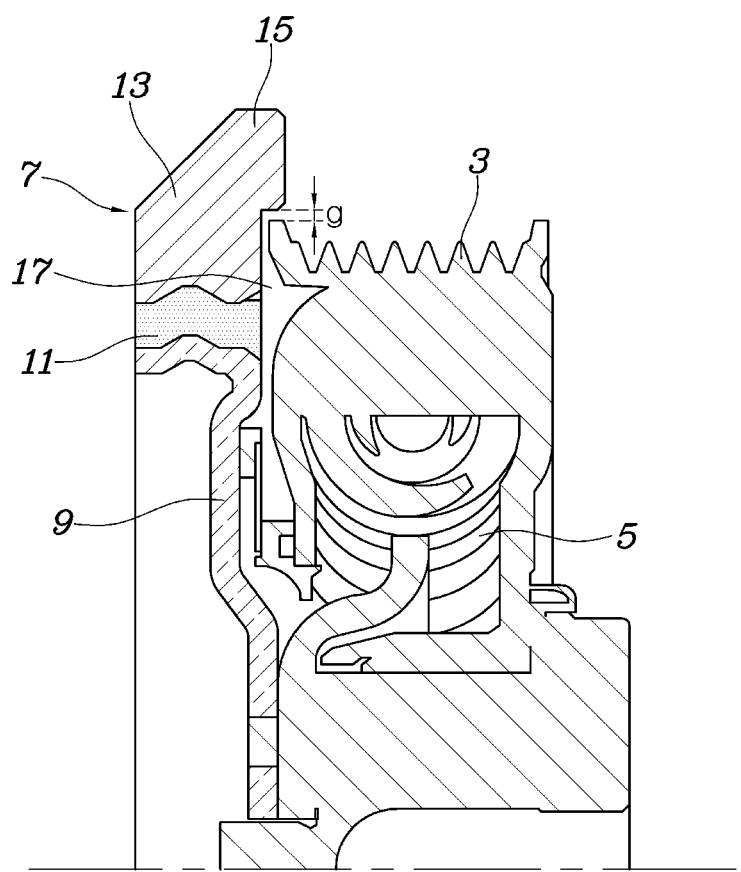
FIG. 4 is a view showing a configuration that a stepped portion blocks a cavity in the radial direction thereof in the belt pulley structure according to an exemplary embodiment of the present disclosure.

Referring to FIGS. 3 and 4, the technical features of the present disclosure will be described in detail. The present disclosure may include a cavity 17 formed at a portion where the belt pulley 3 and the torsional vibration damper 7 face each other and a stepped portion 15 that closes the cavity 17 in the radial direction thereof. The stepped portion 15 may be formed as a flange or other ridge or tread like component which has a protrusion (e.g., part of the component extends further than the rest).

Additionally, a pulley decoupler 5 may be coupled with the shaft of the belt pulley 3 to reduce the torsional vibration, and the torsional vibration damper 7 may be fastened to the pulley decoupler 5 in an axial direction thereof via bolts or other fastening mechanisms. In other words, the cavity 17 formed between the pulley decoupler 5 and the torsional vibration damper 7 generates resonance, which is a sound box due to vibration of the engine and the pulley decoupler 5, and the resonance occurs in a specific frequency band.

In the related art, the cavity is formed in a structure opened in a radial direction, and thus, resonance occurring at a specific frequency is emitted to the outside of the cavity, thereby causing abnormal noise in the engine. Thus, the stepped portion 15 in the present disclosure is provided in the radial direction of the cavity 17, and thus, the sound waves generated in the cavity 17 are blocked by the stepped portion 15 and unable to radiate to the outside of the cavity 17, thereby changing the resonance characteristic in the belt pulley structure to prevent the occurrence of abnormal noise in the engine structure.

Referring to FIG. 4, in the configuration of an exemplary embodiment of the stepped portion 15, the torsional vibration damper 7 may be coupled with the belt pulley 3 in an axial direction thereof. Additionally, the stepped portion 15 may be formed at the torsional vibration damper 7 to protrude towards the belt pulley 3.

In other words, the stepped portion 15 may be formed at the torsional vibration damper 7 to protrude towards the belt pulley 3, and thus, the protruded stepped portion 15 may block the cavity 17. To be more specific, the cavity 17 may be formed between one surface in an axial direction including a rim of one end portion of the belt pulley 3 and the torsional vibration damper 7 opposed thereto (e.g., disposed opposite thereto). Thus, the stepped portion 15 may be formed in a shape that protrudes towards the belt pulley 3 and covers the inlet of the cavity 17. In other words, the stepped portion 15 may be formed in a shape that covers and encloses the inlet of the cavity 17 in the radial direction. Accordingly, sound waves generated in the cavity 17 are not emitted outside the cavity 17.

Further, the step portion 15 may be formed to have a shape that covers the rim of one end portion of the belt pulley 3. In other words, the stepped portion 15 may cover the inlet of the cavity 17 and block the portion adjacent to the inlet, to block the sound waves generated in the cavity 17 from radiating in the radial direction. On the other hand, the stepped portion 15 may be formed with a predetermined gap g in the radial direction with respect to the rim of the end portion of the belt pulley 3. In other words, the stepped portion 15 may be arranged in the radial direction of the cavity 17 to prevent sound waves from being emitted to the outside and formed to be spaced apart from the rim of the one end portion of the belt pulley 3 (e.g., no contact with the rim), thereby preventing the occurrence of friction noise due to the interference between the stepped portion 15 and the rim of the one end portion of the belt pulley 3.

As described above, the stepped portion 15 of the present disclosure may be formed at the torsional vibration damper 7 and formed at an inertial ring 13 pf the torsional vibration damper 7. For example, the inertial ring 13 may be coupled along a circumferential direction of the torsional vibration damper 7, and the inertial ring 13 may be a mass body that reduces the torsional vibration of the engine with sufficient inertia force. For reference, a damper rubber 11 may be disposed on the inner side of the inertial ring 13, and a damper hub 9 may be disposed on the inner side of the rubber to couple the damper hub 9 to the pulley decoupler 5.

In addition, a stepped portion 15 may be formed on one surface of the inertial ring 13 facing the belt pulley 3 with a shape protruding and being stepped (e.g., gradual increase in height or protrusion) toward the belt pulley 3. In other words, the stepped portion 15 may be formed in a stepped shape on the inertial ring 13 (e.g., flange or ridge protrusion) and the stepped portion may be positioned in the radial direction of the cavity 17, to prevent the sound waves generated in the cavity 17 from being emitted outside the cavity 17. Further, the stepped portion 15 may formed integrally at the inertial ring 13 to omit a separate component for providing the stepped portion 15, thereby simplifying the overall structural configuration. In other words, multiple components are not required to form the stepped portion to cover the cavity.

As described above, the stepped portion 15 may be arranged in the radial direction of the cavity 17 in the present disclosure, to block the sound waves generated in the cavity 17 from being emitted outside the cavity 17, thereby changing resonance characteristic of the belt pulley structure and thus preventing abnormal noise in the engine structure from being occurred.

While the present disclosure has been described in detail only for the exemplary embodiments above, numerous variations and modifications within the scope of the technical disclosure of the present disclosure are evident to a person of ordinary skill in the art, and it is natural to fall within the scope of the appended claims.

What is claimed is:
1. A belt pulley structure of an engine, comprising:
   a stepped portion formed in a shape that blocks a cavity in a radial direction, wherein the cavity is provided at a portion where a belt pulley and a torsional vibration damper face each other;

an inertial ring coupled to the torsional vibration damper along a circumferential direction thereof;

wherein the stepped portion is formed to be stepped at one surface of the inertial ring with a protruding shape that extends towards the belt pulley;

a pulley decoupler coupled to the belt pulley;

a damper rubber disposed on an inner side of the inertial ring; and a damper hub disposed on an inner side of the damper rubber, wherein the damper hub is directly coupled to the pulley decoupler;

wherein the cavity generates resonance due to vibration of the engine and the pulley decoupler in a specific frequency band; and wherein sound waves generated by the cavity are blocked by the stepped portion.

2. The belt pulley structure of the engine of claim 1, wherein the torsional vibration damper is coupled to the belt pulley in an axial direction thereof and the stepped portion is formed at the torsional vibration damper to protrude toward the belt pulley.

3. The belt pulley structure of the engine of claim 2, wherein the cavity is formed between one surface in an axial direction including a rim of one end portion of the belt pulley and the torsional vibration damper facing the one surface and the stepped portion is formed in a protruding shape to cover an inlet of the cavity.

4. The belt pulley structure of the engine of claim 3, wherein the stepped portion is formed in a shape that covers the rim of the one end portion of the belt pulley.

5. The belt pulley structure of the engine of claim 4, wherein the stepped portion is formed with a predetermined gap in a radial direction from the rim of the one end portion of the belt pulley.

6. The belt pulley structure of the engine of claim 1, wherein
   the torsional vibration damper is coupled to the pulley decoupler.

7. A vehicle having a belt pulley structure according to claim 1.

* * * * *